United States Patent
Vaishnav

(10) Patent No.: US 10,719,473 B2
(45) Date of Patent: Jul. 21, 2020

(54) LIBRARY FOR SEAMLESS MANAGEMENT OF STORAGE DEVICES

(71) Applicant: Western Digital Technologies, Inc., San Jose, CA (US)

(72) Inventor: Yatindra Vaishnav, Milpitas, CA (US)

(73) Assignee: Western Digital Technologies, Inc., San Jose, CA (US)

(*) Notice: Subject to any disclaimer, the term of this patent is extended or adjusted under 35 U.S.C. 154(b) by 84 days.

(21) Appl. No.: 15/828,229

(22) Filed: Nov. 30, 2017

(65) Prior Publication Data

US 2018/0089135 A1  Mar. 29, 2018

Related U.S. Application Data

(63) Continuation of application No. 14/983,308, filed on Dec. 29, 2015, now Pat. No. 9,836,427.

(60) Provisional application No. 62/167,733, filed on May 28, 2015.

(51) Int. Cl.
*G06F 3/06* (2006.01)
*G06F 13/42* (2006.01)

(52) U.S. Cl.
CPC ............ *G06F 13/42* (2013.01); *G06F 3/0607* (2013.01); *G06F 3/0661* (2013.01); *G06F 3/0689* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 5,991,775 A * | 11/1999 | Beardsley | ........... G06F 12/0866 707/999.205 |
| 6,397,267 B1 | 5/2002 | Chong, Jr. | |
| 7,130,970 B2 * | 10/2006 | Devassy | ............... G06F 3/0613 711/154 |
| 7,502,886 B1 | 3/2009 | Kowalchik et al. | |
| 8,161,222 B1 | 4/2012 | Chamseddine et al. | |
| 2002/0062387 A1 | 5/2002 | Yatziv | |
| 2004/0019706 A1 | 1/2004 | Smith | |
| 2004/0117522 A1 | 6/2004 | Loffink et al. | |
| 2004/0225775 A1 | 11/2004 | Pellegrino et al. | |
| 2014/0059295 A1 | 2/2014 | Northcutt et al. | |
| 2014/0325146 A1 | 10/2014 | Madhusudana et al. | |
| 2015/0301749 A1 | 10/2015 | Seo et al. | |

OTHER PUBLICATIONS

Combined Search and Examination Report, GB1608752.0, dated Oct. 26, 2016 (9 pages).

* cited by examiner

*Primary Examiner* — Brian R Peugh
(74) *Attorney, Agent, or Firm* — Patent Law Works LLP

(57) ABSTRACT

An approach for using a storage library to translate commands from one command language into a different command language. The approach includes receiving a storage request in a command language from an application. The storage request is directed to a target storage device that uses a different command language. The storage request is translated into the different command language of the target storage device using a storage library of command languages and the storage request is performed.

20 Claims, 6 Drawing Sheets

LIBRARY FOR SEAMLESS MANAGEMENT OF STORAGE DEVICES

CROSS REFERENCE TO RELATED APPLICATION

This application a continuation of and claims priority to U.S. application Ser. No. 14/983,308, now U.S. Pat. No. 9,836,427, entitled "Library for Seamless Management of Storage Devices," filed Dec. 29, 2015, which claims priority under 35 U.S.C. § 119, of U.S. Provisional Patent Application No. 62/167,733, filed May 28, 2015 and entitled "Library for Seamless Management of Storage Devices," the entire contents of each of which are incorporated herein by reference.

BACKGROUND

Various levels of storage sub-systems are available in the real storage market. For example, there are multiple RAID controllers that provide for data reliability. Accessing storage devices (e.g., disks, solid-state drives, etc.) behind sub-system controllers is more difficult than a directly attached storage device. Additionally, access to storage devices behind the sub-system controllers may be further complicated since each sub-system provider may use a proprietary access mechanism. Software developers building an application to interface with a storage system including one or more storage sub-systems (e.g., multiple RAID controllers from various providers) typically have to understand the proprietary interface for each sub-system and write code to interface with each sub-system separately. Thus, there is a need for a single library to access storage devices, which may be behind various sub-system controllers or directly attached to the storage system, seamlessly.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

The present disclosure relates to managing storage devices in a storage system. In particular, the present disclosure relates to a library for seamless management of storage devices in a storage system, whether or not the storage devices are directly accessible or behind a separate controller (e.g., a RAID controller).

Systems, methods and interfaces for seamlessly managing storage devices in a storage system are described below. While the systems and methods of the present disclosure are described in the context of a system having multiple storage sub-systems, controllers, and client devices, it should be understood that the systems, methods, and interfaces can be applied to other arrangements.

Figure 1:
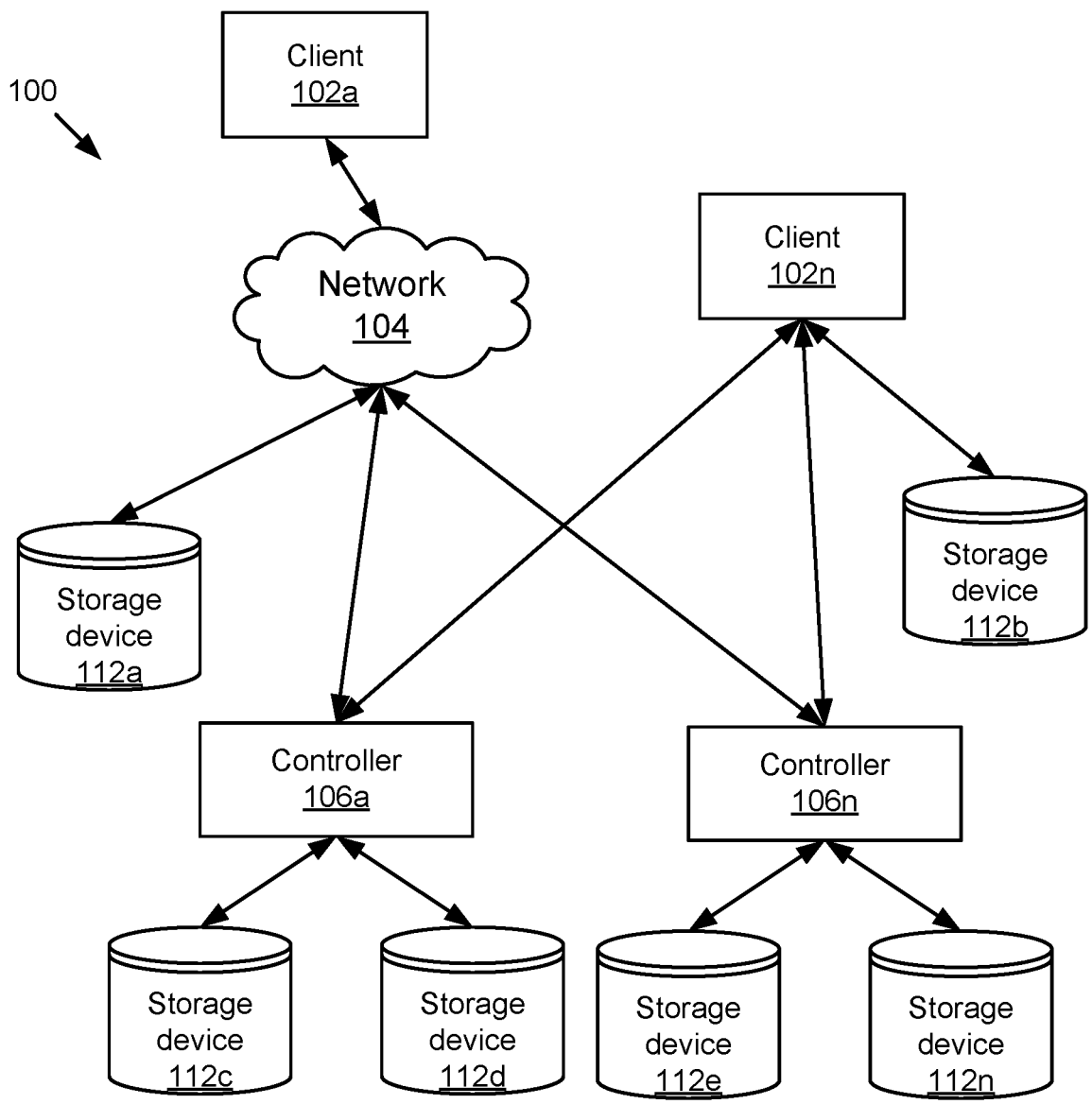
FIG. 1 is a high-level block diagram illustrating an example system including a storage system having multiple storage sub-systems.

FIG. 1 is a high-level block diagram illustrating an example system 100 including a storage system having multiple storage sub-systems. The system 100 includes client devices 102a . . . 102n, a network 104, and a storage subsystem including one or more storage controllers 106a . . . 106n and storage devices 112a . . . 112n.

The client devices 102a . . . 102n can be any computing device including one or more memories and one or more processors, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of making storage requests. A client device 102 may execute an application that makes storage requests (e.g., read, write, etc.) to the storage devices 112. While the example of FIG. 1 includes two client devices, 102a and 102n, it should be understood that any number of client devices 102 may be present in the system. A client device 102 may be directly coupled with storage sub-systems including individual storage devices (e.g., storage devices 112a . . . 112b) or storage devices 112c . . . 112n behind storage controllers 106a . . . 106n.

In some embodiments, the system 100 includes one or more storage controllers 106 that provide a single interface for the client devices 102 to access the storage devices 112 in the storage system. In various embodiments, the storage devices 112c . . . 112n may be directly connected with the storage controller 106 (e.g., storage device 112c . . . 112n) or may be connected through additional storage controllers that in turn connect to storage controllers 106a . . . 106n. The storage controller 106 may be a computing device configured to make some or all of the storage space on disks 112 available to client device 102. As depicted in the example system 100, client devices 102 can be coupled to the storage controller 106 via network 104 (e.g., client device 102a) or directly (e.g., client device 102n).

The network 104 can be a conventional type, wired or wireless, and may have numerous different configurations including a star configuration, token ring configuration, or other configurations. Furthermore, the network 104 may include a local area network (LAN), a wide area network (WAN) (e.g., the internet), and/or other interconnected data paths across which multiple devices (e.g., storage controller 106, client device 112, etc.) may communicate. In some embodiments, the network 104 may be a peer-to-peer network. The network 104 may also be coupled with or include portions of a telecommunications network for sending data using a variety of different communication protocols. In some embodiments, the network 104 may include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 1 illustrates one network 104, in practice one or more networks 104 can connect the entities of the system 100.

Figure 2A:
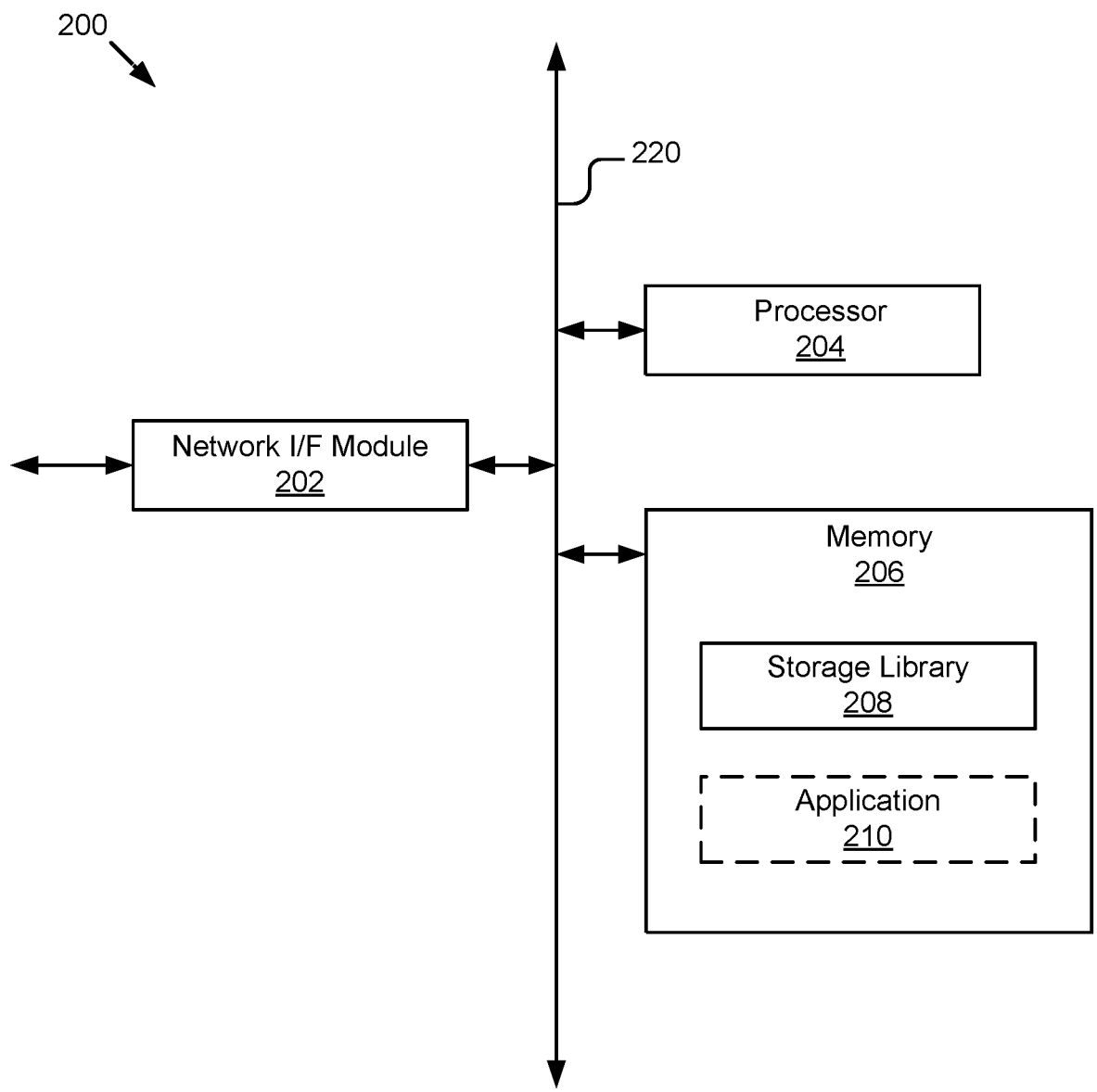
FIGS. 2A and 2B are block diagrams illustrating example systems for accessing storage devices according to the present disclosure.
Figure 2B:
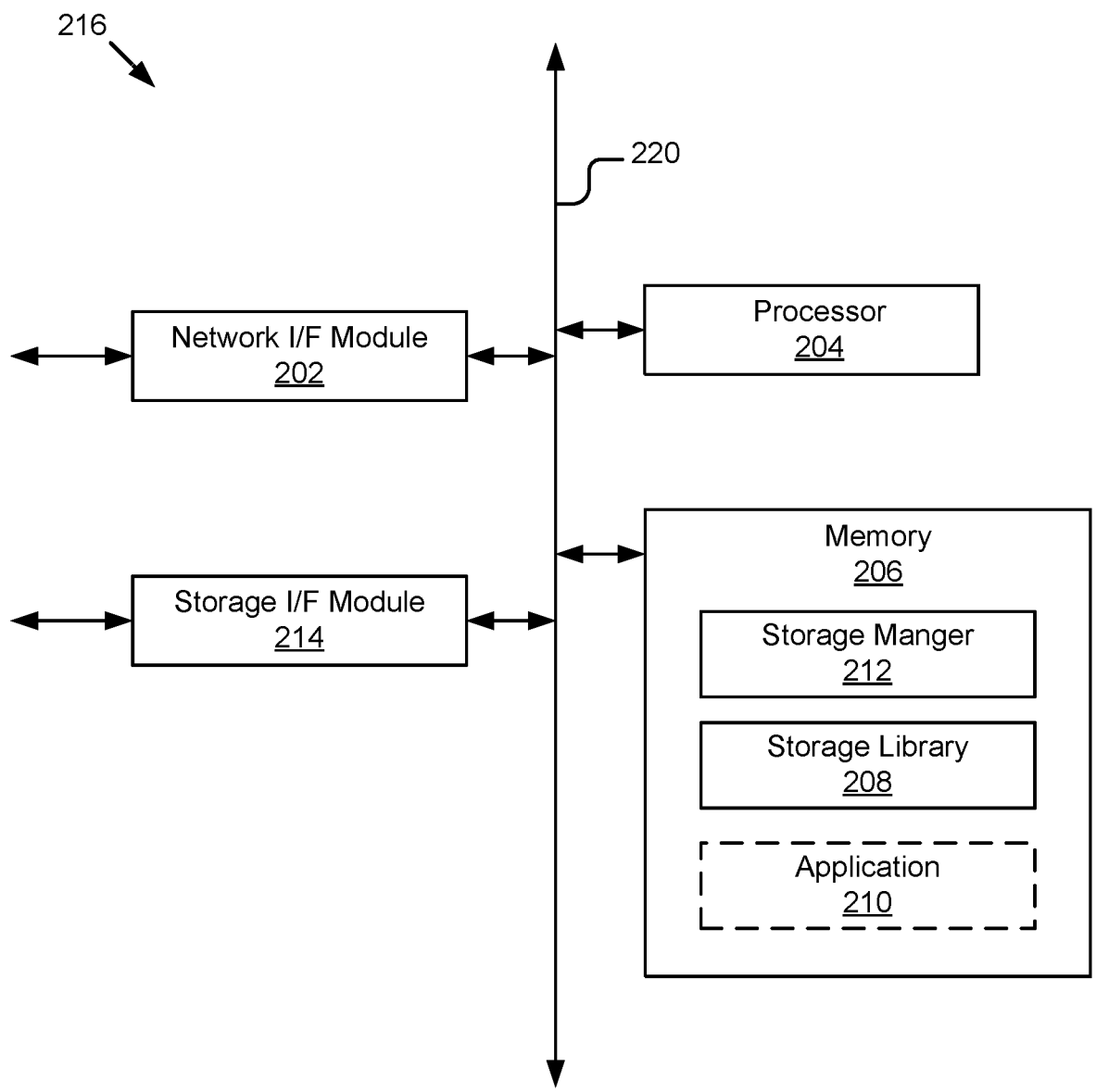

FIGS. 2A and 2B are block diagrams illustrating example systems. In FIG. 2A example system 200 may be executed on the client device 102 for accessing storage devices 112 according to the present disclosure. In FIG. 2B example system 216 may be executed on the storage controller 106 for accessing storage devices 112 according to the present disclosure. In further embodiments, the systems 200 or 216 may be implemented as a combination of a client device 102 and storage controller 106.

In the example of FIG. 2A and FIG. 2B, the system 200 includes a network interface (I/F) module 202, a processor 204, and a memory 206. FIG. 2B may further include a storage interface (I/F) module 214. The components of the system 200 are communicatively coupled to a bus or software communication mechanism 220 for communication with each other.

The network interface module 202 is configured to connect system 200 to a network and/or other system (e.g., network 104). For example, network interface module 202 may enable communication through one or more of the internet, cable networks, and wired networks. The network interface module 202 links the processor 204 to the network 104 that may in turn be coupled to other processing systems (e.g., storage controller 106). The network interface module 202 also provides other conventional connections to the network 104 for distribution and/or retrieval of files and/or media objects using standard network protocols such as TCP/IP, HTTP, HTTPS and SMTP as will be understood. In some implementations, the network interface module 202 includes a transceiver for sending and receiving signals using WiFi, Bluetooth® or cellular communications for wireless communication.

The processor 204 may include an arithmetic logic unit, a microprocessor, a general purpose controller or some other processor array to perform computations and provide electronic display signals to a display device. In some implementations, the processor 204 is a hardware processor having one or more processing cores. The processor 204 is coupled to the software communication mechanism 220 for communication with the other components. Processor 204 processes data signals and may include various computing architectures including a complex instruction set computer (CISC) architecture, a reduced instruction set computer (RISC) architecture, or an architecture implementing a combination of instruction sets. Although only a single processor is shown in the examples of FIG. 2A and FIG. 2B, multiple processors and/or processing cores may be included. It should be understood that other processor configurations are possible.

The memory 206 stores instructions and/or data that may be executed by the processor 204. In the illustrated implementation, the memory 206 includes a storage library 208, and, optionally, an application 210. In FIG. 2B the memory 206 may also include a storage manager 212. The memory 206 is coupled to the software communication mechanism 220 for communication with the other components of the system 200. The instructions and/or data stored in the memory 206 may include code for performing the techniques described herein. The memory 206 may be, for example, non-transitory memory such as a dynamic random access memory (DRAM) device, a static random access memory (SRAM) device, flash memory or some other memory devices.

The memory 206 may further include, for example, a non-transitory storage device such as a dynamic random access memory (DRAM) device, a static random access memory (SRAM) device, flash memory or some other memory device. In some implementations, the memory 206 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device.

Software communication mechanism 220 may be an object bus (e.g., CORBA), direct socket communication (e.g., TCP/IP sockets) among software modules, remote procedure calls, UDP broadcasts and receipts, HTTP connections, function or procedure calls, etc. Further, any or all of the communication could be secure (SSH, HTTPS, etc.). The software communication mechanism 220 can be implemented on any underlying hardware, for example, a network, the Internet, a bus, a combination thereof, etc.

The storage I/F module 214 in FIG. 2B cooperates with the storage manager 212 to access information requested by the client devices 102. The storage device 112 may be any type of attached array of writable storage media, such as magnetic disk or tape, optical disk (e.g., CD-ROM or DVD), flash memory, solid-state drive (SSD), micro-electro mechanical and/or any other similar media adapted to store information, including data and parity information. The storage I/F module 214 includes a plurality of ports having input/output (I/O) interface circuitry that couples with the disks over an I/O interconnect arrangement.

The storage manager 212 in FIG. 2B, stored on memory 206 and configured to be executed by processor 204, facilitates access to data stored on the storage devices 112. In certain embodiments, the storage manager 212 logically organizes data as a hierarchical structure of named directories and files on the storage devices 112.

Application 210 may be stored in memory 206 and configured to be executed by processor 204 when the system 200 is acting as a client device 102. In other embodiments, application 210 may be executed by a client device 102 separate from the system 200 as in system 216.

Storage library 208 may act as an interface between the application 210 and the storage manager 212 to provide the application 210 read access and write access to the data stored on storage devices 112. In one embodiment, the storage library 208 provides an application programming interface (API) to manage storage devices 112 in the system 100. The storage library 208 further may provide a uniform interface to the various controllers 106 in the storage system (e.g., a RAID controller). Thus, the application 210 can be designed to access storage devices behind a storage controller with a single set of commands that the storage library 208 translates to the various proprietary interfaces of controllers 106 or storage devices 112. Storage library 208 further may provide a uniform interface for developers across platforms (e.g., Windows, Linux, etc.) to access the controllers 106 or storage devices 112. Further, the storage library 208 may provide ease of application development when a storage system includes more than one storage controller 106 by different providers, vendors, or manufacturers, a heterogeneous storage controller 106, and/or a system having both storage controllers 106 and direct connected storage devices 112. Additionally, the storage library 208 can support various types of commands, e.g., third party special commands or protocol specifications (e.g., vendor specific SCSI commands), SCSI, SATA, ATA, NVMe, etc. The library further provides an interface for updating storage device firmware, retrieving SMART (Self-Monitoring, Analysis and Reporting Technology) stats for a storage device, formatting sectors of various size on the storage devices, and issuing storage commands (e.g., SCSI/SATA commands).

In numerous embodiments, the storage library 208 may be implemented in various programming languages. For example, the API provided by storage library 208 may be implemented in a high level scripting language (e.g., python, etc.), a middle tier language (e.g., Java, C#, etc.), or a lower level language (e.g., C, etc.). In one embodiment, implementing the API in C provides easy integration for developers building applications in various languages.

Figure 3:
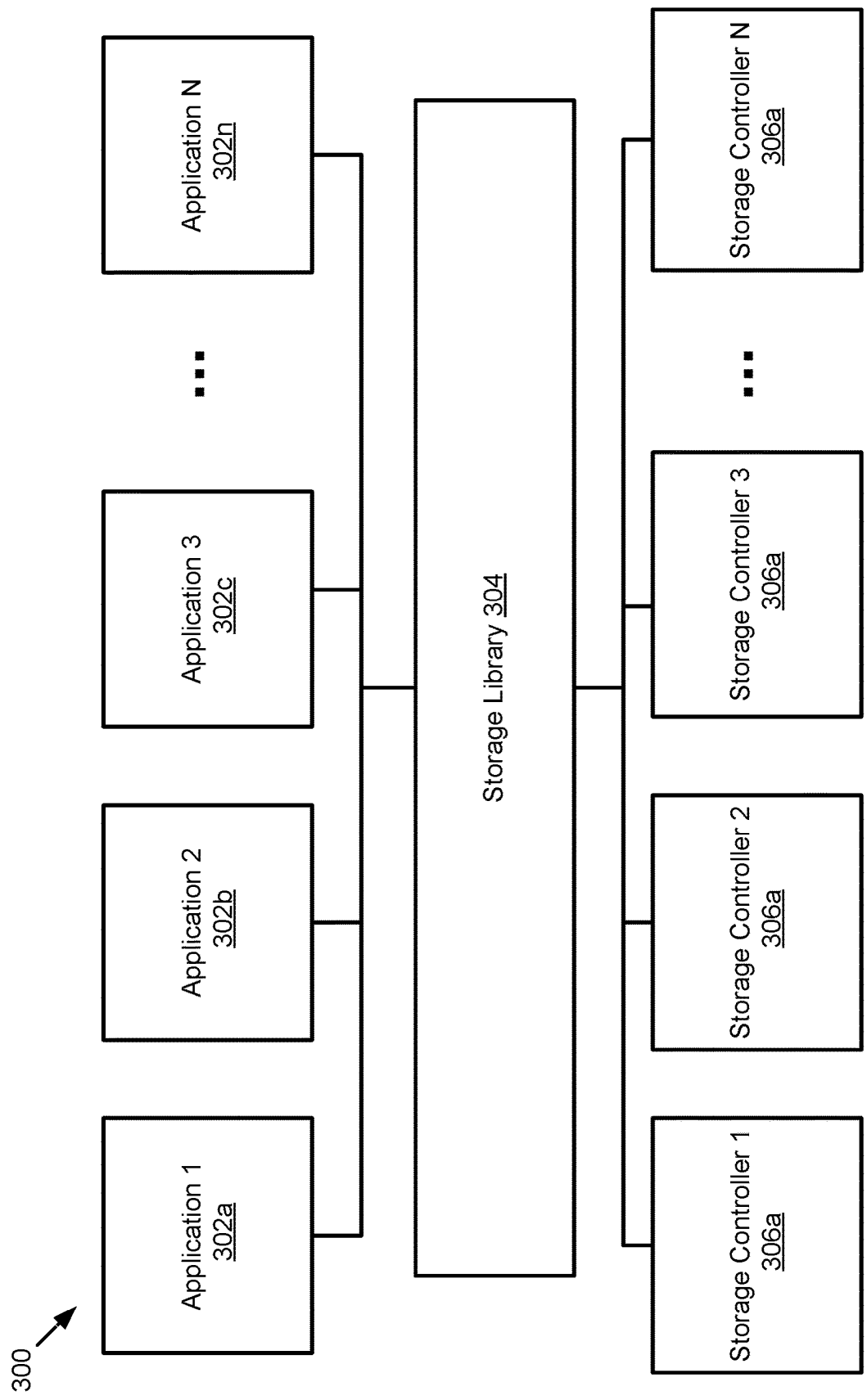
FIG. 3 is an example block diagram illustrating a storage library as an interface between applications and various RAID controllers.

FIG. 3 is an example block diagram 300 illustrating a storage library 304 as an interface between applications 302 and various storage controllers 306. The applications 302 may run on the client device 102 and interact with the storage library 304 through an API. The applications 302 may interact with the API and may include functionality to receive a storage request from a client device 102 and provide a seamless interaction with a storage controller 306 and storage devices behind the storage controller 306, regardless of what command language the storage controller 306 is designed to use. The storage library 304 may include a software development kit (SDK). The storage library 304 may be a dynamic link library (DLL) or a shared object (SO). In various embodiments, the storage library 304 supports multiple platforms, such as Windows, Linux, and ESXi. The storage library 304 may receive the storage request from the application 302 as will be discussed further below with regards to FIGS. 4 and 5, translate the storage request, and send the translated storage request to a specific storage controller 306. The storage command received by the storage controller 306 may be a storage command in the appropriate language for the storage controller 306 to provide access and functionality to the storage device via the storage controller 306.

Figure 4:
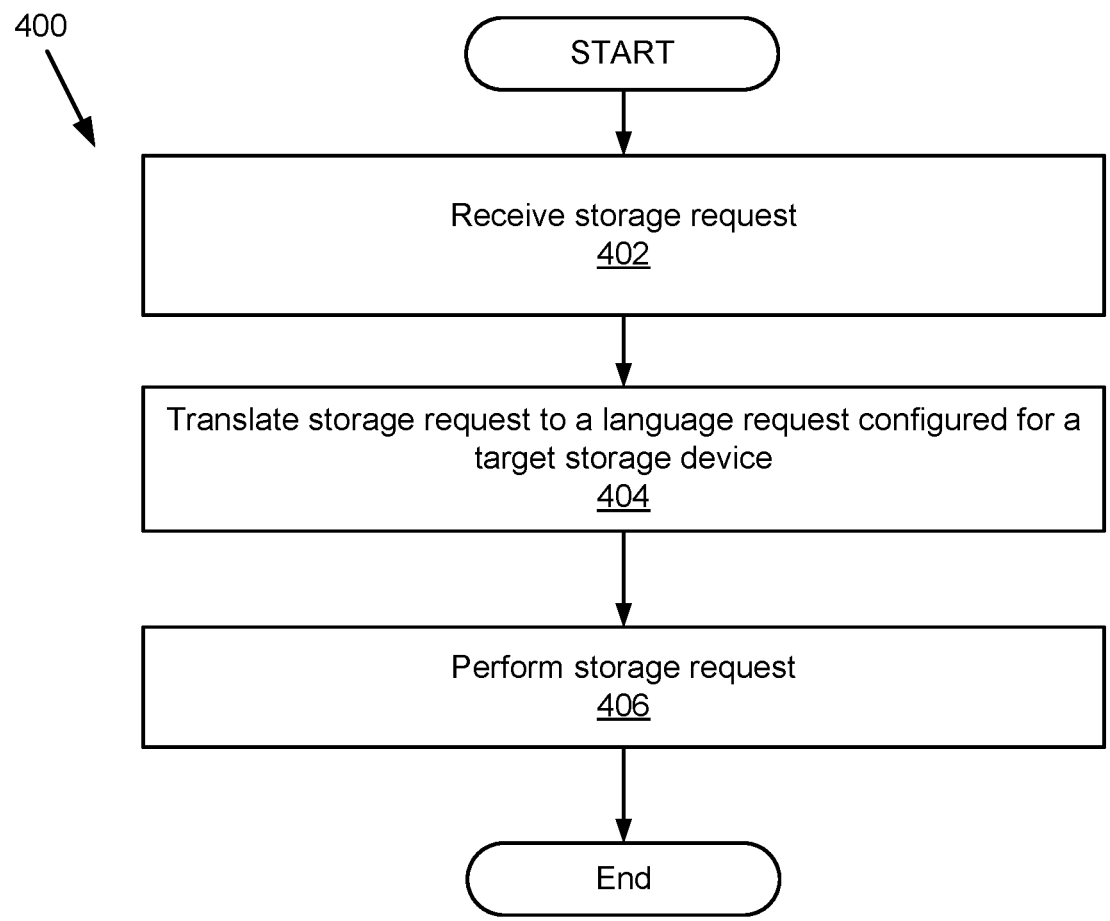
FIG. 4 is a flowchart of an example method for accessing a storage sub-system via a library according to the present disclosure.

FIG. 4 is a flowchart of an example method 400 for accessing a storage sub-system (e.g., storage devices behind a RAID controller) via a library according to the present disclosure. At 402, the storage manager 212 receives a storage request from application 210. The storage request may be received, for example via an API exposed by storage library 208. At 404, the storage library 208 translates the storage request to a request configured for a target storage device identified in the storage request. At 406, the storage manager 212 performs the storage request.

Figure 5:
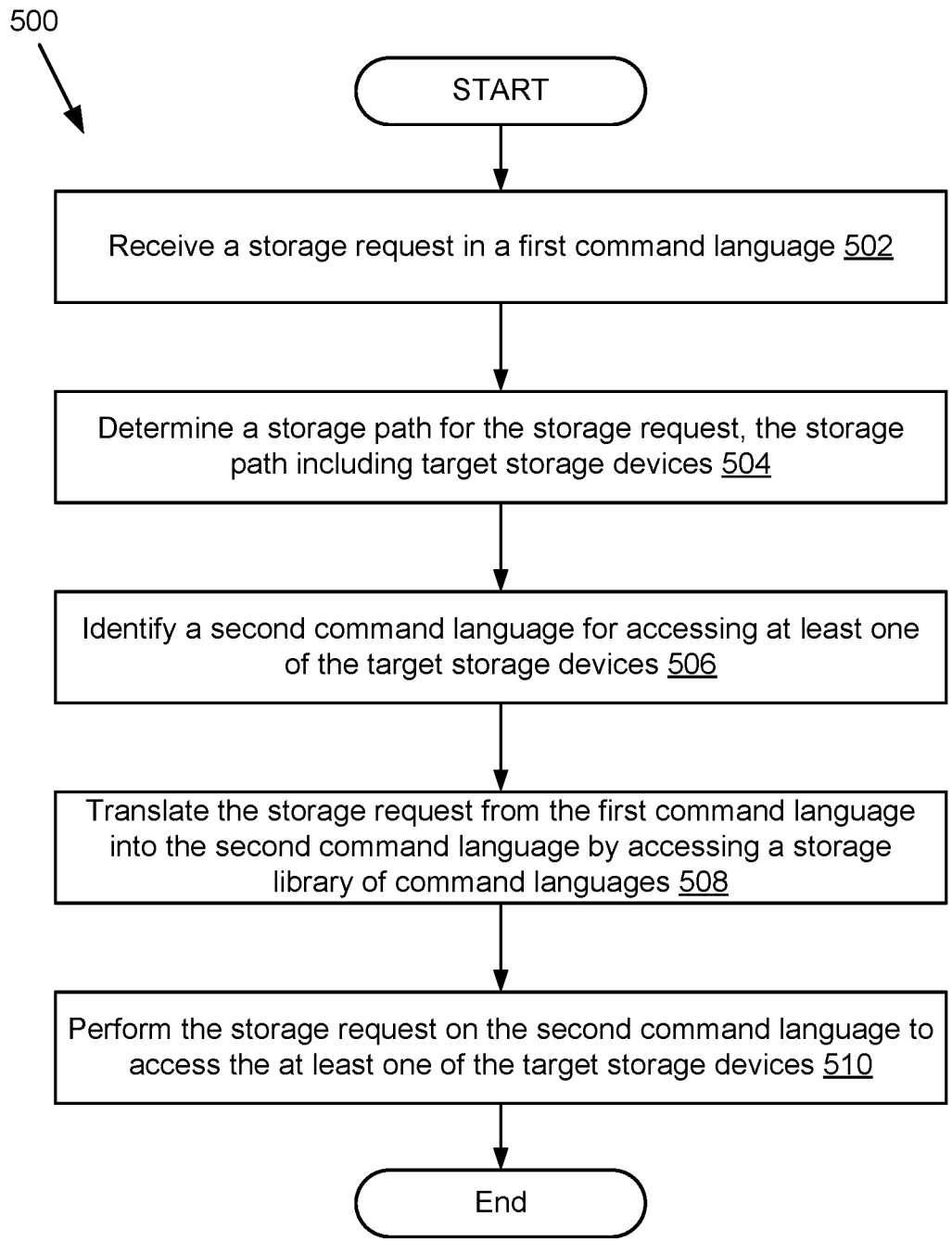
FIG. 5 is a flowchart of an example method for accessing a storage sub-system via a library according to the present disclosure.

FIG. 5 is a flowchart of another example method 500 for accessing a storage sub-system via a library according to the present disclosure. At 502, the storage manager 212 receives a storage request in a first command language from application 210. The storage request may be received, for example via an API exposed by storage library 208. The storage request may be in a command language specific to communicate with a specific storage controller from a particular provider, vendor, or manufacturer. At 504, the storage library 208 determines a storage path connecting the controller 106 to a storage device 112, based on the storage request. The storage path may be connected to target storage devices. The storage path may connect a controller 106 to a single storage device 112 or alternatively multiple storage devices 112. The storage path may connect a controller 106 to storage devices 112 directly or may be connected to storage devices 112 behind additional controllers (e.g. RAID controllers). By determining a storage path, the storage library 208 may be able to determine which command language the storage request is translated into based on which storage devices 112 the storage path is connected to. At 506, the storage library 208 identifies a second command language for accessing at least one of the target storage devices located along the storage path. The second command language may be a command language specific to a provider, vendor, or manufacturer of a specific storage controller of storage device (e.g. RAID controllers). At 508, the storage library 208 translates the storage request from the first command language into the second command language. The translation may be done by accessing the storage library 208 of command languages that were gathered from different provider/vendor/manufacturer storage devices. The storage library 208 may be capable of translating all of the storage commands necessary to access all of the storage devices connected to the controller 106. At 510, the controller 106 performs the storage request by using the second command language to access the target storage device.

Systems and methods for seamlessly managing storage devices in a storage system have been described. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method comprising:
   receiving, by a client device, a storage request in a first command language from an application;
   determining, by the client device, a storage path connecting a storage controller directly to a target storage device based on the storage request, wherein:
      the target storage device is accessible via the storage controller and the storage controller is one of a plurality of storage controllers configured to be coupled to the client device; and
      each of the plurality of storage controllers is configured to be accessed using a different command language;
   identifying, by the client device, a second command language to access the storage controller;
   translating, by the client device, the storage request from the first command language into the second command language by accessing a storage library of command languages; and
   sending, by the client device, the storage request in the second command language to the storage controller to perform the storage request by accessing the target storage device via the storage controller.

2. The method of claim 1, wherein the storage request is received via an application program interface provided by the storage library.

3. The method of claim 1, wherein the target storage device is connected using a protocol specification selected from one of Small Computer System Interface (SCSI), AT Attachment (ATA), Serial ATA (SATA), Serial Attached SCSI (SAS), or Non-Volatile Memory express (NVMe).

4. The method of claim 1, wherein:
   the plurality of storage controllers includes a first storage controller and a second storage controller;
   the first storage controller is configured to be accessed using the second command language; and
   the second storage controller is configured to be accessed using a third command language.

5. The method of claim 1, wherein the storage library is a collection of manufacturer specific command languages for accessing storage devices from different manufacturers.

6. The method of claim 1, wherein the storage request is a command for updating firmware of the target storage device.

7. The method of claim 1, wherein the storage request is a command to retrieve SMART (Self-Monitoring, Analysis and Reporting Technology) statistics.

8. The method of claim 1, wherein the storage request is a command to format one or more sectors.

9. A system comprising:
one or more processors; and
a memory storing instructions that, when executed by the one or more processors, cause the system to:
receive, by a client device, a storage request in a first command language from an application;
determine, by the client device, a storage path connecting a storage controller directly to a target storage device based on the storage request, wherein:
the target storage device is accessible via the storage controller and the storage controller is one of a plurality of storage controllers configured to be coupled to the client device; and
each of the plurality of storage controllers is configured to be accessed using a different command language;
identify, by the client device, a second command language to access the storage controller;
translate, by the client device, the storage request from the first command language into the second command language by accessing a storage library of command languages; and
send, by the client device, the storage request in the second command language to the storage controller to perform the storage request by accessing the target storage device via the storage controller.

10. The system of claim 9, wherein the storage request is received via an application program interface provided by the storage library.

11. The system of claim 9, wherein:
the plurality of storage controllers includes a first storage controller and a second storage controller;
the first storage controller is configured to be accessed using the second command language; and
the second storage controller is configured to be accessed using a third command language.

12. The system of claim 9, wherein the storage library is a collection of manufacturer specific command languages for accessing storage devices from different manufacturers.

13. The system of claim 9, wherein the target storage device is connected using a protocol specification selected from one of Small Computer System Interface (SCSI), AT Attachment (ATA), Serial ATA (SATA), Serial Attached SCSI (SAS), or Non-Volatile Memory express (NVMe).

14. The system of claim 9, wherein the storage request is a command to format one or more sectors.

15. A system comprising:
means for receiving, by a client device, a storage request in a first command language from an application;
means for determining, by the client device, a storage path connecting a storage controller directly to a target storage device based on the storage request, wherein:
the target storage device is accessible via the storage controller and the storage controller is one of a plurality of storage controllers configured to be coupled to the client device; and
each of the plurality of storage controllers is configured to be accessed using a different command language;
means for identifying, by the client device, a second command language to access the storage controller;
means for translating, by the client device, the storage request from the first command language into the second command language by accessing a storage library of command languages; and
means for sending, by the client device, the storage request in the second command language to the storage controller to perform the storage request by accessing the target storage device via the storage controller.

16. The system of claim 15, wherein the storage request is received via an application program interface provided by the storage library.

17. The system of claim 15, wherein the target storage device is connected using a protocol specification selected from one of Small Computer System Interface (SCSI), AT Attachment (ATA), Serial ATA (SATA), Serial Attached SCSI (SAS), or Non-Volatile Memory express (NVMe).

18. The system of claim 15, wherein:
the plurality of storage controllers includes a first storage controller and a second storage controller;
the first storage controller is configured to be accessed using the second command language; and
the second storage controller is configured to be accessed using a third command language.

19. The system of claim 15, wherein the storage library is a collection of manufacturer specific command languages for accessing storage devices from different manufacturers.

20. The system of claim 15, wherein the storage request is a command to format one or more sectors.

\* \* \* \* \*